Patented Oct. 25, 1949

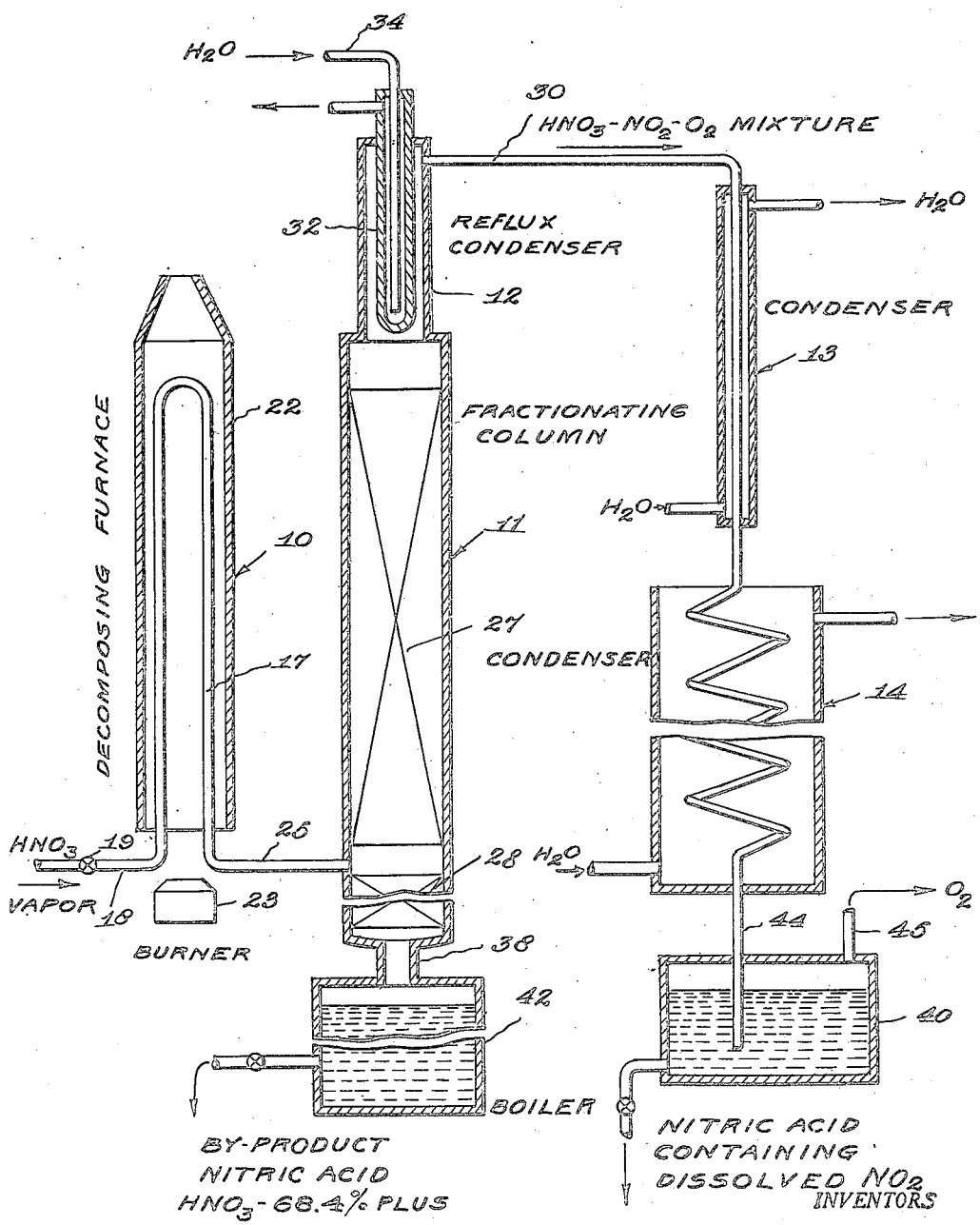

2,486,083

UNITED STATES PATENT OFFICE 2,486,083

MANUFACTURE OF NITRIC ACID

William E. Watson, West Orange, N. J., and John W. Glenn, Buffalo, N. Y., assignors to Allied Chemical & Dye Corporation, a corporation of New York Application September 13, 1944, Serial No. 553,922

2 Claims. (Cl. 23—160)

This invention relates to manufacture of nitric acid containing dissolved nitrogen peroxide. In the art, the term "fuming nitric acid" is used to denote nitric acid containing dissolved $NO_2$, whether the product is anhydrous or hydrous to some appreciable extent. The present improvements are directed particularly to processes for making substantially anhydrous fuming nitric acid preferably of high total acidity. In this specification, "total acidity" is used to designate the number of parts by weight of 100% $HNO_3$ which would be present in 100 parts of product if all of the fixed nitrogen thereof were present as $HNO_3$. For example, 100 parts by weight of a product having a total acidity of "105%" contains such an amount of dissolved $NO_2$ that if all of the fixed nitrogen including dissolved $NO_2$ existed as $HNO_3$, there would be present 105 parts by weight of 100% $HNO_3$.

Production of fuming nitric acid involves, in one way or another, formation of nitrogen peroxide and dissolution or absorption of the same in strong nitric acid. It is known that the reaction, $4HNO_3 \rightarrow 2H_2O + 2NO_2 + O_2$, proceeds to some degree when strong nitric acid is distilled. However, at low temperatures, this reaction reaches an equilibrium and is reversible, and the amount of dissociation of $HNO_3$ to $NO_2$ at the boiling temperature of strong or even pure nitric acid is entirely too small for practical production of fuming nitric acid.

It has also been proposed to make nitric acid containing dissolved $NO_2$ by reaction of nitric acid on metallic copper, and absorption of the generated $NO_2$ in strong nitric acid. This procedure has a marked disadvantage of forming a large amount of cupric nitrate by-product for which there is no substantial market. Further, there is also formed an appreciable amount of NO which passes over with the $NO_2$ into the nitric acid absorbent. In such absorbing liquor, NO reacts with strong $HNO_3$ to form $NO_2$, and water the presence of which cuts the strength of the product and under even the most favorable operating conditions makes impractical the production of fuming nitric acid of total acidity higher than about 103%, Sp. G. about 1.51.

Another prior method for making nitric acid containing dissolved $NO_2$ includes the addition of starch or other organic material to strong nitric acid to reduce a portion of the $HNO_3$ to $NO_2$, and subsequent distillation of the resulting nitric acid liquor. This procedure presents the difficulty that starch or other organic material under certain circumstances may be nitrated with the formation of unstable and dangerous explosive compounds so that a commercial size operation is attended with considerable hazard. Also, when starch or other organic material is added to nitric acid and the resulting liquor distilled, practically all of the oxides of nitrogen are liberated before nitric acid begins to distill, thus causing condensation and absorption difficulties. Additionally, the action of nitric acid on starch yields substantial amounts of NO as well as $NO_2$ with the result that the water formed in the final absorbing nitric acid, by reason of reaction of NO and strong nitric acid, reduces the strength of the fuming nitric acid product in the same way as in the nitric acid-copper process.

From the foregoing it will be noted that, aside from the disadvantages of production of cupric nitrate by-product and unstable nitrated compounds, the difficulties encountered in practice in production of fuming nitric acid arise out of the presence of water or NO or both in the $NO_2$ gas which is absorbed in nitric acid to make fuming nitric acid, and the presence of water in the final product itself.

Primary purpose of this invention is to provide processes capable of producing fuming nitric acids of high total acidity. A further object is to accomplish these ends by procedural steps which do not involve the operating difficulties above mentioned.

We have discovered a process by the practice of which it is possible to substantially completely eliminate water from the system, thus enabling us to make a fuming nitric acid of high total acidity and to attain this result without formation of uneconomic or troublesome by-products. Briefly, in its broader aspects the invention comprises forming a certain gas-vapor mixture containing $HNO_3$ vapor, water vapor, $NO_2$ and substantially no NO, separating from such gas-vapor mixture substantially all of the water contained therein without liquefying all of the $HNO_3$ vapor, and then from the resulting residual gas-vapor mixture containing $HNO_3$ vapor and $NO_2$ recovering liquid nitric acid containing dissolved $NO_2$.

While the above first mentioned gas-vapor mixture may be made in any suitable way, the more usual practice of the invention involves utilization of the above noted reaction in which $HNO_3$ is decomposed by heating to form water vapor, $NO_2$ and oxygen. Thus, in accordance with preferred embodiments of the invention, nitric acid is partially decomposed while in the vapor phase to form a decomposition zone exit gas-vapor mixture containing certain amounts of undecomposed $HNO_3$, water vapor, $NO_2$, oxygen, and substantially no NO. This hot gas-vapor mixture is then partly cooled in such a way as to condense out substantially all of the water as aqueous nitric acid but without condensing all of the $HNO_3$ vapor, and minimize significant dissolution of $NO_2$ in the aqueous nitric acid which does become liquefied. Subsequently the residual gas-vapor mixture containing $HNO_3$ vapor, $NO_2$, and oxygen, and substantially no NO is further cooled under conditions to liquefy the remaining $HNO_3$ and absorb $NO_2$ therein.

The attached drawing shows, partly in section and partly diagrammatically, one form of apparatus in which the improved process may be carried out. The equipment comprises chiefly a decomposition furnace 10, a partial condenser or fractionating column 11 having at the top a reflux condenser 12, and condensers 13 and 14 in which the final product is liquefied.

Nitric acid in vaporous condition is supplied to the decomposition zone, constituted for example by a U-bend pipe 17 which may be made of aluminum, through inlet pipe 18 controlled by valve 19. Pipe 17 lies within a heating shell 22 open at the top and provided at the bottom with a suitable gas or oil burner 23. The gas-vapor mixture formed in the decomposition chamber passes thru pipe 25 into column 11 which may be provided with upper and lower sections 27 and 28 which may be provided with suitable packing or plates if desired.

In practice, the $HNO^3$ vapor charged into the decomposition chamber may be obtained from any suitable source. Thus, pipe 18 may be connected to the outlet of a nitric acid concentrator, not shown, which as known in the art may be readily operated to produce a nitric acid vapor containing say 90–98% $HNO_3$, balance water. Alternatively, inlet 18 may be connected to the outlet of a pot still, not shown, in which strong nitric acid is vaporized by heating.

A constant boiling nitric acid-water mixture contains by weight 68.4% $HNO_3$ and 31.6% $H_2O$. For reasons which will hereinafter appear, from whatever source derived, the nitric acid vapor fed into pipe 18 should contain, on the basis of the water present in the incoming nitric acid vapor, at least more $HNO_3$ than does a constant boiling $HNO_3$-water mixture, i. e. the weight ratio of $HNO_3$ to $H_2O$ should be more than 68.4:31.6. Although the principles of the invention are utilizable and operative, the instant process does not afford any particularly significant economic advantages when the vapor entering pipe 18 contains appreciably less than 80% by weight of $HNO_3$, the balance, in systems of the type under discussion usually consisting of water vapor. In preferred practice, nitric acid vapor charged into the decomposing zone contains upwards of 90% and usually about 95% by weight of $HNO_3$.

Temperatures maintained in the decomposition zone in pipe 17 may be anything high enough to effect vapor phase decomposition of $HNO_3$ to form water, $NO_2$ and oxygen. Ordinarily, temperatures throughout the decomposition zone should be not less than 150° C. Under good conditions of operations, heating of the decomposition zone is such that temperatures of the gas-vapor stream in pipe 25 are held at an over-all average of about 180° C. Maximum decomposition temperatures are matters for practical consideration depending upon the degree of $HNO_3$ decomposition desired and the adaptability of the apparatus to withstand corrosion. As a rule no practical advantage is had by maintaining decomposition zone temperatures higher than about 300° C.

During passage through pipe 17, at least some of the $HNO_3$ is decomposed by heating to water vapor, $NO_2$ and oxygen. We find that during the course of this reaction as carried out under the operating conditions of the instant process, no discernible amount of NO is formed. Except for one controlling factor, degree of $HNO_3$ decomposition in pipe 17 may vary over a wide range as will hereinafter appear.

Principal characteristic variables of the decomposition reaction are the $HNO_3$ strength of the vapor fed in thru pipe 18, the length of the decomposition zone, the particular temperature maintained therein, and the rate of passage of the gas-vapor mixture thru the decomposition zone. The gas-vapor mixture in the entire system may be under any pressure, plus or minus, suitable to effect flow thru the process at any desired controlled rate. Rate of flow of gas-vapor mixture thru the decomposition zone and subsequent phases of the process may be controlled by adjustment of valve 19.

In the practice of all embodiments of the invention, taking into consideration the above stated decomposition zone variables, the vapor phase decomposition reaction is regulated and carried out so that the gas-vapor mixture in pipe 25 contains some $NO_2$, water vapor and more $HNO_3$ vapor than can be condensed out with the total water present as a constant boiling $HNO_3$-water mixture. In the next following step of the instant process, substantially all of the water present in the system is removed as aqueous nitric acid of constant boiling strength (68.4% by weight $HNO_3$) or stronger. Hence, it will be seen that if the weight ratio of $HNO_3$ to $H_2O$ in pipe 25 is not more than 68.4:31.6, i. e. if the gas-vapor mixture in pipe 25 does not contain more $HNO_3$ vapor than can be condensed out with total water present as a constant boiling $HNO_3$-water mixture, following substantially complete removal of water there would be no uncondensed substantially anhydrous $HNO_3$ vapor available for condensation as final product. Because of the decomposition zone variables above mentioned, and the permissibly wide variability of quantity and total acidity of the final product, it is not feasible to prescribe within numerical limits the degree to which partial decomposition of $HNO_3$ vapor in pipe 17 should be effected under all circumstances.

The next operational phase comprises separating substantially all of the water from the gas-vapor mixture discharged from the decomposition zone, and carrying out this separation under conditions such as to prevent condensation of all of the $HNO_3$ vapor. The result of controlled water removal is formation, in exit pipe 30 of reflux condenser 12, of a residual gas-vapor mixture containing $HNO_3$ vapor, $NO_2$, oxygen, and substantially no $H_2O$ or NO. The foregoing is accomplished by passing the gas-vapor mixture from pipe 25 upwardly thru fractionating column 11, preferably provided at the top with the reflux condenser 12. The total inner space enveloped by column 11 and condenser 12 constitutes a fractionating zone. The shell of column 11, which may be made of "Duriron," is ordinarily filled with packing such as Raschig rings or other suitable material arranged to provide good contact between the gas-vapor mixture and downflowing condensate. Reflux condenser 12 and its exit pipe 30, and the cooling element 32 of the reflux condenser may be made of materials such as "Duriron," tantalum or glass. To minimize possibility of losing some $NO_2$ by dissolution in the aqueous nitric acid liquefied during the presently described water separating step, it is preferred to carry out gas-vapor flow and liquid refluxing in countercurrent relation.

During passage thru the fractionating column and the reflux condenser, the gas-vapor mixture is cooled to a temperature low enough to effect condensation as aqueous nitric acid of substantially all of the water vapor contained in the gas-vapor mixture. Cooling conditions prevailing in tower 11 and condenser 12 may be determined by the temperature of the residual gas-vapor mixture entering pipe 30, which temperature in turn may be controlled by suitable regulation of the cooling water input thru pipe 34 to the cooling unit 32.

It will be understood that all water condensed out in column 11 and reflux 12 necessarily takes out of the gas-vapor mixture enough $HNO_3$ to form an aqueous nitric acid of $HNO_3$ strength of at least that of the constant boiling liquid $HNO_3$-water mixture, i. e. enough nitric acid vapor is condensed to form a condensate containing at least 68.4% $HNO_3$ by weight. The constant boiling $HNO_3$-water mixture condenses at about 120–122° C., which is not low enough to separate all of the water from the gas-vapor mixture. If cooling in condenser 11 and reflux 12 were not proceeded with to a greater extent, nitric acid of some $HNO_3$ strength greater than 68.4% and less than 100% would pass into pipe 30 and carry out of the reflux substantial quantities of water. To prevent this, the principal cooling step variables such as design of column 11 and condenser 12, rate of flow of gas-vapor mixture thru the fractionating column and reflux condenser, and degree of cooling effected by unit 32 are chosen and operated so that temperature of the gas-vapor mixture exciting condenser 12 and entering pipe 30 is not more than the boiling point of 100% nitric acid at the pressure of operation, i. e. 86° C. if substantially atmospheric pressure is employed, thus resulting in a reflux of anhydrous $HNO_3$ in reflux condenser 12 adjacent the gas-vapor exit pipe 30. However, since water may have an appreciable vapor pressure at around the boiling point of 100% nitric acid, and in order to avoid use of a cooling zone of uneconomic height, it is preferred to maintain temperature at the inlet end of pipe 30 of not more than about 80° C., or at corresponding temperatures if operating pressures are other than atmospheric. At reflux condenser exit temperatures of less than 86° C. it will be understood that more $HNO_3$ is condensed than is needed to satisfy the $HNO_3$ requirements of the $HNO_3$—$H_2O$ constant boiling mixture. Hence, the lower the temperature (below 86° C.) of the reflux condenser exit, the higher is the $HNO_3$ content of the condensate running out of the bottom of the fractionating column thru outlet 38. In the preferred modes of operation, temperatures at the inlet of pipe 30 are held at about 65–70° C., or at corresponding temperatures if operating pressures are other than atmospheric. The condensate discharged from fractionating column outlet 38 is of $HNO_3$ strength of the order of 70 to 96% by weight.

It will be recalled that the gas-vapor mixture entering the bottom of the fractionating column in any case contains more $HNO_3$ than can be condensed out with the total water present as a constant boiling $HNO_3$-water mixture. Thus, provided fractionating and refluxing conditions are properly controlled, there is always available at least some $HNO_3$ vapor as such to pass out of the reflux condenser. Temperatures at the inlet end of pipe 30 should be always less than the 86° C., but how much less depends upon how much cooler than 86° C. a given reflux exit should be in order under the particular conditions of operation to condense out substantially all of the water present in the system. While in a practical operation, gas-vapor temperature at this point may be as low as 60° C., or at corresponding temperatures if operating pressures are other than atmospheric, in any case such temperature should not be low enough under the existing conditions to condense out all of the $HNO_3$ vapor.

Because of the permissibly wide variability of the quantity and quality, i. e. total acidity, of the final product collected in tank 40, the variable conditions under which the decomposition reaction in furnace 10 may be carried out, and the design and operational variables inherent in the use of the fractionating column and reflux, aside from the conditions already stated it is not possible to set forth in any significantly comprehensive manner the limits within which the compositions of the gas-vapor mixtures entering column 11 or leaving reflux 12, rates of flow of the gas-vapor mixture, the degrees of gas-vapor mixture cooling, and the compositions of the liquors leaving the bottom of column 11 may be varied.

As stated the liquor discharged from the bottom of column 11 always has an $HNO_3$ strength in excess of 68.4%. If desired such liquor may be returned to a known type apparatus for reconcentration. However, for most economic results, the effluent of column 11 may run into a reboiler 42 to which heat is supplied in amount sufficient to boil out and return to column 11 the $HNO_3$ content above about 70%. Thus, in conjunction with lower packed section 28 of tower 11, the liquid in the boiler may be kept at about the constant boiling composition, and the maximum amount of $HNO_3$ is utilized in manufacture of fuming nitric acid product.

The residual substantially anhydrous gas-vapor mixture in pipe 30, containing $HNO_3$ vapor, $NO_2$, oxygen, and substantially no NO is further cooled under any conditions suitable to effect total condensation of $HNO_3$ and dissolution or absorption of the $NO_2$ therein. The mixture may be passed downwardly thru condensers 13 and 14 which are water-cooled to temperature low enough to condense nitric acid. To obtain best absorption of $NO_2$, the $NO_2$ gas and the nitric acid vapor being condensed are passed in co-flow relation until liquefaction of nitric acid is substantially complete. Overall operation of condensers 13 and 14 is such that the temperature of the liquor in outlet pipe 44 is about 10 to 30° C. Preferably the outlet end of pipe 44 extends to within a short distance of the bottom of tank 40 so as to facilitate substantially complete absorption of any $NO_2$ which may have been unabsorbed in the condensers. Oxygen and any other inert gas are discharged from the system thru outlet 45.

The process of the invention may be operated to produce fuming nitric acids having total acidities varying upward from anything slightly above 100%. In practice, a product analyzing 36.07% $NO_2$ and 64.87% $HNO_3$ and having a total acidity of 114.78% has been made. Marked advantages of the development are that fuming acid having total acidity varying from 105 to 110% may be manufactured readily with satisfactory economic yields and without operating difficulties.

For a given input of $HNO_3$ vapor to the decomposing furnace, operating conditions throughout the system may be varied and chosen to suit the type of final product desired. For example, if it is desired to obtain a high total acidity product, either a relatively high degree of decomposition in furnace 10 is required, that is, it is necessary to carry $HNO_3$ decomposition to an extent sufficient to form the $NO_2$ needed, and/or the cooling action of reflux condenser 12 may be effected at a high rate to condense a large portion of the undecomposed $HNO_3$ present. In these circumstances, it will be appreciated that the amount of $HNO_3$ vapor available for final condensation is decreased with the result that in the making of a high total acidity fuming acid the quantity of product is lessened. Conversely, if it is desired to make a product having a relatively low total acidity of say 102–103%, a relatively small amount of $NO_2$ is needed in the system, in which case decomposition conditions in furnace 10 are adjusted so as to decompose a smaller quantity of $HNO_3$ and/or the reflux condenser 12 is adjusted to the minimal rate of permissible $HNO_3$ condensation, thus raising the amount of $HNO_3$ vapor available for final condensation and correspondingly decreasing the amount of $NO_2$ available for dissolution in the final $HNO_3$ condensate.

Assuming a given $HNO_3$ input to furnace 10, a given set of operating conditions in column 11, reflux condenser 12 and in total condensers 13 and 14, the quantity and total acidity of the product recovered in tank 40 may be adjusted by raising or lowering the temperature in the $HNO_3$ decomposing zone. Similarly, for given decomposing zone temperatures, and given conditions in column 11, reflux condenser 12 and also in the total condensers 13 and 14, the nature of the product recovered in tank 40 may be controlled by regulation of the rate of flow of the gas-vapor mixture thru the system. For high flow rate, $HNO_3$ decomposition in furnace 10 is low, the quantity of $NO_2$ formed is low, and the result is production of a relatively large amount of fuming product of relatively low total acidity. On the other hand, if rate of flow of the gas-vapor mixture thru the system is decreased, $HNO_3$ decomposition in furnace 10 is increased, the quantity of $HNO_3$ vapor in pipe 30 is decreased and the amount of $NO_2$ present is increased, thus recovering on final condensation a smaller quantity of product having a higher total acidity. It will be apparent to those skilled in the art that the many operating factors involved in practice of the process may be changed in several ways other than those just indicated, and likewise it will be appreciated that, aside from taking into consideration the critical limiting conditions described herein, the particular conditions to be chosen for any particular plant are dependent upon the situation at hand and the nature of the desired final product with respect to quantity and total acidity. The operating characteristics of any given apparatus set-up may be readily determined by trial runs.

In one example of operation of the process, nitric acid vapor containing by weight about 99% $HNO_3$ and about 1% $H_2O$, and obtained from a commercial nitric acid concentrator, was introduced into a decomposing furnace similar to that shown on the drawing. Rate of flow of the vaporous mixture was such that each increment thereof was in the decomposing zone for about 0.9 second. Temperature of the fire gas leaving the top of the furnace was about 220° C., and temperature of the gas-vapor mixture in the pipe between the bottom of the decomposing furnace and the fractionating column was about 182° C. In this instance about 10.5% of the $HNO_3$ present in the decomposing furnace was decomposed, and the resulting gas mixture contained by weight about 88.6% $HNO_3$, 7.8% $NO_2$, 2.3% $H_2O$, 1.3% $O_2$, and no detectable NO. The fractionating column (which was not equipped with a boiler such as 42 of the drawing) and associated reflux condenser were controlled so that the residual gas-vapor mixture exiting the reflux was at temperature of about 65° C., and the temperature of the reflux acid leaving the bottom of the fractionating column was about 63° C. Pressure existing at the top of the fractionating column was about minus 7¾" of $H_2O$. Analyses of the final condensed product and of the reflux acid discharged from the bottom of the fractionating column were as follows:

|  | Product | Reflux |
|---|---|---|
| Per cent $HNO_3$ | 79.3 | 96.1 |
| Per cent Oxides as $NO_2$ | 21.1 | 0.036 |
| Per cent Iron | .00025 | .00053 |
| Degrees Be. at 60° F | 54.9 | 47.1 |

Total acidity of the above product was 108.2% (Sp. G. 1.611). Total yield of product and reflux acid, based on the total nitrogen input as $NO_2$ was nearly 100%. Of the total $HNO_3$ input, about 40% by weight was recovered as product, and 60% as fractionating tower effluent acid. In this particular example, the operation was purposely conducted so that the reflux acid ran more than 95% $HNO_3$ so that this material would be disposed of directly thru commercial channels without the necessity of reconcentration.

In another series of runs, $HNO_3$ vapor was supplied to a decomposing chamber by boiling strong nitric acid in a pot still. In a first run, 842.8 parts by weight of nitric acid containing 98.62% $HNO_3$ were placed in a pot still, and 139.8 parts were vaporized over into a decomposing chamber. 106 parts by weight of product having a total acidity of 107.2%, and 17.6 parts of reflux effluent having a total acidity of 87.4% were obtained. Total yield based on total nitrogen as $NO_2$ was 93.5%, as product 82.6%, and as intermediate reflux 10.9%. In another run, 688.2 parts by weight of nitric acid analyzing 98.67% $HNO_3$ were placed in a pot still. 152.9 parts were distilled over into a decomposition zone. 121.6 parts of product having a total acidity of 107.1%, and 18.2 parts of intermediate reflux acid having a total acidity of 85.4% were obtained. Total yield based on total nitrogen as $NO_2$ was 97%, as product 86.8%, and as intermediate reflux acid 10.2%. In a third run, 477.8 parts by weight of nitric acid analyzing 98.01% $HNO_3$ were placed in a pot still, and 150.6 parts were distilled over into a decomposition chamber. 111.9 parts of product having a total acidity of 106.3% and 18.5 parts of intermediate reflux effluent having a total acidity of 85.3% were obtained. Total yield based on total nitrogen as $NO_2$ was 90.5%, as product 80.8%, and as intermediate reflux acid 9.7%. In this series of runs, actual total yields (as products plus intermediate reflux acids) were higher than stated above because in each instance appreciable amounts of reflux acid were retained associated with the packing in the fractionating zone and could not be accurately measured.

We claim:

1. The process for making substantially anhydrous nitric acid containing dissolved $NO_3$ which comprises introducing into a decomposition zone nitric acid vapor containing not less than 80% by weight of $HNO_3$, heating said nitric acid vapor in said zone to temperature sufficient to decompose a portion of the $HNO_3$ to water, oxygen and $NO_2$, conducting said heating under conditions to form a decomposition zone exit gas-vapor mixture containing $NO_2$, water vapor and more $HNO_3$ vapor than can be condensed out with total water present as the constant boiling $HNO_3$-water mixture, introducing said gas-vapor mixture containing $NO_2$ and $HNO_3$ vapor into a fractionating zone, cooling said gas-vapor mixture in said fractionating zone to a temperature sufficiently low and under conditions to create at the gas-vapor exit of said fractionating zone a reflux of substantially 100% $HNO_3$, but maintaining said temperature not low enough to effect condensation of all of the $HNO_3$ contained in said mixture, withdrawing from said fractionating zone gas-vapor exit as overhead a substantially 100% $HNO_3$ vapor containing $NO_2$, discharging from said fractionating zone as bottoms a nitric acid liquor containing substantially all of the water introduced into said fractionating zone, and further cooling said overhead under conditions to condense nitric acid and at the same time dissolve $NO_2$ therein.

2. The process for making substantially anhydrous nitric acid containing dissolved $NO_2$ which comprises introducing into a decomposition zone nitric acid vapor containing not less than 90% by weight of $HNO_3$, heating said nitric acid vapor in said zone to temperature sufficient to decompose a portion of the $HNO_3$ to water, oxygen and $NO_2$, conducting said heating under conditions to form a decomposition zone exit gas-vapor mixture containing $NO_2$, water vapor and more $HNO_3$ vapor than can be condensed out with total water present as the constant boiling $HNO_3$-water mixture, introducing said gas-vapor mixture containing $NO_2$ and $HNO_3$ vapor into a fractionating zone, cooling said gas-vapor mixture in said fractionating zone to a temperature sufficiently low and under conditions to create at the gas-vapor exit of said fractionating zone a reflux of substantially 100% $HNO_3$, but maintaining said temperature not low enough to effect condensation of all of the $HNO_3$ contained in said mixture, withdrawing from said fractionating zone gas-vapor exit as overhead a substantially 100% $HNO_3$ vapor containing $NO_2$, discharging from said fractionating zone as bottoms a nitric acid liquor containing substantially all of the water introduced into said fractionating zone, and further cooling said overhead to temperature low enough to liquefy nitric acid while passing the $NO_2$ and nitric acid of said overhead in co-flow relation whereby $NO_2$ is dissolved in such liquefied nitric acid.

WILLIAM E. WATSON.
JOHN W. GLENN.

REFERENCES CITED

The following references are of record in the file of this patent:

UNITED STATES PATENTS

| Number | Name | Date |
|---|---|---|
| 1,324,255 | Jensen | Dec. 9, 1919 |

FOREIGN PATENTS

| Number | Country | Date |
|---|---|---|
| 13,842 | Great Britain | June 8, 1914 |
| 131,642 | Great Britain | July 2, 1918 |

OTHER REFERENCES

Fritz Ephraim, Inorganic Chemistry, Modern Pub. Co. (N. Y.) 4th ed., page 690 (1943).